United States Patent
Abhishek Raja et al.

(10) Patent No.: US 10,754,687 B2
(45) Date of Patent: Aug. 25, 2020

(54) SCHEDULING IN A DATA PROCESSING APPARATUS

(71) Applicant: Arm Limited, Cambridge (GB)

(72) Inventors: . Abhishek Raja, Autin, TX (US); Chris Abernathy, Austin, TX (US); Michael Filippo, Driftwood, TX (US)

(73) Assignee: Arm Limited, Cambridge (GB)

(*) Notice: Subject to any disclaimer, the term of this patent is extended or adjusted under 35 U.S.C. 154(b) by 129 days.

(21) Appl. No.: 16/005,811

(22) Filed: Jun. 12, 2018

(65) Prior Publication Data
US 2019/0377599 A1  Dec. 12, 2019

(51) Int. Cl.
G06F 9/48 (2006.01)
G06F 9/50 (2006.01)
G06F 9/38 (2018.01)
G06F 9/30 (2018.01)

(52) U.S. Cl.
CPC ........ *G06F 9/4881* (2013.01); *G06F 9/30145* (2013.01); *G06F 9/38* (2013.01); *G06F 9/3836* (2013.01); *G06F 9/3838* (2013.01); *G06F 9/3857* (2013.01); *G06F 9/3887* (2013.01); *G06F 9/48* (2013.01); *G06F 9/4843* (2013.01); *G06F 9/50* (2013.01); *G06F 9/5005* (2013.01); *G06F 9/5027* (2013.01); *G06F 9/5038* (2013.01)

(58) Field of Classification Search
CPC ........ G06F 9/48; G06F 9/4843; G06F 9/4881; G06F 9/50; G06F 9/5005; G06F 9/5027; G06F 9/5038; G06F 9/38; G06F 9/3836; G06F 9/3838
See application file for complete search history.

(56) References Cited

U.S. PATENT DOCUMENTS

| | | | |
|---|---|---|---|
| 2004/0025163 A1* | 2/2004 | Babutzka | G06F 9/5038 718/106 |
| 2005/0027974 A1* | 2/2005 | Lempel | G06F 9/3844 712/239 |
| 2012/0023314 A1* | 1/2012 | Crum | G06F 9/3826 712/214 |
| 2014/0325187 A1* | 10/2014 | Estlick | G06F 9/3828 712/214 |
| 2014/0380023 A1* | 12/2014 | Smaus | G06F 9/3826 712/216 |
| 2014/0380024 A1* | 12/2014 | Spadini | G06F 9/3834 712/217 |
| 2015/0277925 A1* | 10/2015 | Sleiman | G06F 9/3851 712/215 |

* cited by examiner

*Primary Examiner* — Charles M Swift
(74) *Attorney, Agent, or Firm* — Nixon & Vanderhye P.C.

(57) ABSTRACT

There is provided a data processing apparatus that includes processing circuitry for executing a plurality of instructions. Storage circuitry stores a plurality of entries, each entry relating to an instruction in the plurality of instructions and including a dependency field. The dependency field stores a data dependency of that instruction on a previous instruction in the plurality of instructions. Scheduling circuitry schedules the execution of the plurality of instructions in an order that depends on each data dependency. When the previous instruction is a single-cycle instruction, the dependency field includes a reference to one of the entries that relates to the previous instruction, otherwise, the data dependency field includes an indication of an output destination of the previous instruction.

20 Claims, 9 Drawing Sheets

US 10,754,687 B2

SCHEDULING IN A DATA PROCESSING APPARATUS

The present technique relates to data processing. In particular, the present technique has relevance to the field of scheduling in a data processing apparatus.

In a data processing apparatus, some instructions take longer to execute than others. During this time, other instructions can be prepared for execution—e.g. by being fetched or decoded or passed to other execution units. Out-Of-Order (OOO) execution makes it possible for the order of instructions within a "window" of the overall set of instructions to be rearranged so as to improve the level of Instruction Level Parallelism (ILP).

Viewed from a first example configuration, there is provided a data processing apparatus comprising: processing circuitry to execute a plurality of instructions; storage circuitry to store a plurality of entries, each entry relating to an instruction in the plurality of instructions and comprising a dependency field, wherein the dependency field is to store a data dependency of that instruction on a previous instruction in the plurality of instructions; and scheduling circuitry to schedule the execution of the plurality of instructions in an order that depends on each data dependency, wherein when the previous instruction is a single-cycle instruction, the dependency field comprises a reference to one of the entries that relates to the previous instruction, otherwise, the data dependency field comprises an indication of an output destination of the previous instruction.

Viewed from a second example configuration, there is provided a data processing method, comprising: executing a plurality of instructions; storing a plurality of entries, each entry relating to an instruction in the plurality of instructions and comprising a dependency field, wherein the dependency field is to store a data dependency of that instruction on a previous instruction in the plurality of instructions; and scheduling the execution of the plurality of instructions in an order that depends on each data dependency, wherein when the previous instruction is a single-cycle instruction, the dependency field comprises a reference to one of the entries that relates to the previous instruction, otherwise, the data dependency field comprises an indication of an output destination of the previous instruction.

Viewed from a third example configuration, there is provided a data processing apparatus, comprising: means for executing a plurality of instructions; means for storing a plurality of entries, each entry relating to an instruction in the plurality of instructions and comprising a means for storing a data dependency of that instruction on a previous instruction in the plurality of instructions; and means for scheduling the execution of the plurality of instructions in an order that depends on each data dependency, wherein when the previous instruction is a single-cycle instruction, the dependency field comprises a reference to one of the entries that relates to the previous instruction, otherwise, the data dependency field comprises an indication of an output destination of the previous instruction.

The present technique will be described further, by way of example only, with reference to embodiments thereof as illustrated in the accompanying drawings, in which.

Figure 1:
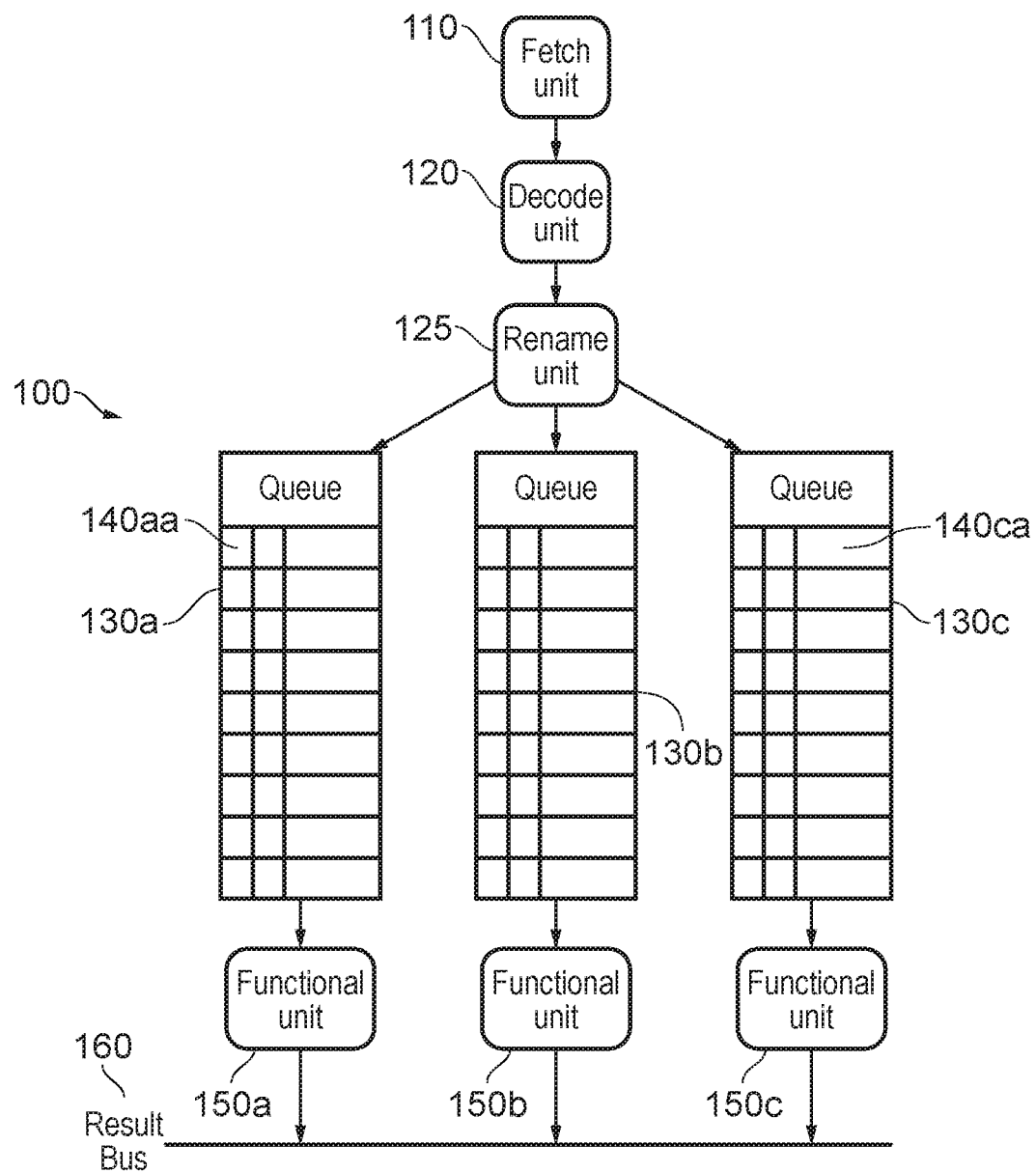
FIG. 1 illustrates an example of a pipeline.

Before discussing the embodiments with reference to the accompanying figures, the following description of embodiments and associated advantages is provided.

In accordance with one example configuration there is provided a data processing apparatus comprising: processing circuitry to execute a plurality of instructions; storage circuitry to store a plurality of entries, each entry relating to an instruction in the plurality of instructions and comprising a dependency field, wherein the dependency field is to store a data dependency of that instruction on a previous instruction in the plurality of instructions; and scheduling circuitry to schedule the execution of the plurality of instructions in an order that depends on each data dependency, wherein when the previous instruction is a single-cycle instruction, the dependency field comprises a reference to one of the entries that relates to the previous instruction, otherwise, the data dependency field comprises an indication of an output destination of the previous instruction.

As previously discussed, in Out-Of-Order (OOO) execution, a plurality of instructions may be executed in an order other than the order in which they appear, for instance, in a program. This is achieved by using scheduling circuitry that can rearrange the order in which the instructions are executed. However, each of the instructions may depend on results produced by one or more other instructions. For instance, one instruction may use the result of a computation performed by an previously executed instruction. These dependencies must be respected and so such an instruction cannot be performed until the earlier instruction has been completed. In particular, if such a dependency is ignored then a different result could be obtained. In the present technique, storage circuitry stores a plurality of entries with each of the entry corresponding to an instruction that is to be executed. Each entry therefore includes a dependency field in order to represent a data dependency associated with that instruction. For instance, if a first instruction performs an operation and stores the result in a register r4, and a second instruction takes the value stored in r4 and adds a value to it, then there is a dependency between the first instruction and the second instruction in respect of the register r4. In the present technique, if the first instruction (that the second instruction is dependent on) is a single-cycle instruction, then the dependency field for an entry corresponding to the second instruction will include a reference to an entry for the first instruction, thereby indicating that the second instruction is dependent on the first instruction. By encoding the dependency field as a reference to one of the entries for the first instruction when the first instruction is a single-cycle instruction, it is possible to maintain a single-cycle pick-to-pick latency. This is because by directly encoding a reference to one of the other entries in the storage circuitry, it is computationally efficient to update the storage circuitry to reflect the consequences of the previous instruction being issued. If the first instruction is a multi-cycle instruction then the data dependency field of the entry relating to the second instruction comprises an indication of an output destination of the first instruction (in this case, register r4). Consequently, the contents of the dependency field changes depending on whether the first instruction is a single-cycle instruction or a multi-cycle instruction. For multi-cycle instructions, a single-cycle pick-to-pick latency cannot be achieved due to the instruction taking multiple cycles to execute and so using the previous encoding would offer no benefit. However, by instead encoding an indication of an output destination of the previous instruction, it is possible to perform early deallocation of entries in the storage circuitry for multi-cycle instructions, thereby making it possible for more instructions to be scheduled and allowing a greater degree of reordering to take place. This is possible because the output destination of the previous instruction is directly known by the entry of the later instruction. Accordingly, both effects can be achieved by carefully encoding the dependency field depending on the nature of the previous instruction producing the result.

In some embodiments, the scheduling circuitry is adapted to issue the instruction in response to resolution of each data dependency of the instruction. As previously stated, an instruction may be represented by one or more entries in the storage circuitry, e.g. one for each dependency. Once all of the dependencies have been resolved, the instruction in question can be issued since all of the data on which that the instruction depends has been made available.

In some embodiments, the scheduling circuitry is adapted to issue the instruction in response to the instruction being the oldest instruction for which each data dependency is resolved. There may be a plurality of instructions for which all of the data dependencies have been resolved. In these embodiments, the oldest such instruction is the instruction that is issued to be executed. This can help to inhibit the existence of instructions that remain awaiting execution for a long period of time.

In some embodiments, the scheduling circuitry is capable of scheduling the execution of the previous instruction and the instruction in contiguous cycles of the processing circuitry. The scheduling circuitry is designed in such a way that the underlying circuitry is able to execute the (dependent) instruction and the previous instruction in contiguous (e.g. neighbouring) cycles of the processing circuitry. In two cycles of the processing circuitry, it is therefore possible to execute two instructions. This represents, for the subset of instructions, a single-cycle pick-to-pick latency.

In some embodiments, each entry comprises a ready field to indicate whether the data dependency has been resolved. By providing a ready field to indicate whether the data dependency has been resolved or not, it is possible to help to determine whether a given instruction has all of its data dependencies met.

In some embodiments, the data processing apparatus comprises update circuitry to update the ready field of an entry in response to the previous instruction being issued for execution.

In some embodiments, the update circuitry comprises comparison circuitry to compare each entry to determine if its data dependency is resolved by execution of the previous instruction. The comparison circuitry receives information regarding an instruction whose execution has initiated. It then compares each entry in the storage circuitry to determine if the data dependency of that entry is resolved by the previous instruction being executed. If so, then it marks the ready field to indicate that the data dependency has been resolved.

In some embodiments, the comparison circuitry comprises a first set of logic gates, a second set of logic gates, and a multiplexer; the first set of logic gates and the second set of logic gates are provided as inputs to the multiplexer; and a switching signal of the multiplexer indicates whether the previous instruction was a single-cycle instruction. The comparison circuitry therefore performs a different comparison (owing to the different encoding provided in the dependency field) depending on whether the previous instruction was a single-cycle instruction.

In some embodiments, at least some of the plurality of instructions relate to a plurality of sources; and each of the entries is associated with one of the plurality of sources. For example, certain instructions may utilise multiple sources (e.g. two registers, the contents of which are added together). In this case, a first entry is provided for that instruction in respect of the first source, and a second entry is provided for that instruction in respect of the second source. Since each source could act as a dependency for an instruction, where comparison circuitry is provided, the comparison circuitry considers each entry associated with each source.

In some embodiments, the previous instruction is executed in one cycle of the processing circuitry; and a period between the previous instruction being issued and the instruction being issued is one cycle of the processing circuitry In some embodiments, a size of the dependency field is the larger of a first component and a second component; the first component is the sum of: the number of bits to identify a group of entries in the storage circuitry, and the number of bits to identify an entry within the group of entries using one-hot or one-cold representation; and the second component is the number of bits required to identify the output destination. There are a number of ways in which the dependency field can be encoded. However, in these embodiments, one of two different encodings is used depending on whether the previous instruction is a single-cycle instruction or a multi-cycle instruction. The first encoding is used in the case of the previous instruction being a single-cycle instruction. This encoding utilises two parts. The first part identifies a group of entries in the storage circuitry. The second part identifies an entry within that group using one-hot or one-cold representation (e.g. a field of numbers where a single number that differs from the other numbers identifies the entry being referred to). The first encoding is then made up of the number of bits necessary to both identify a particular group of entries in storage circuitry and then to identify an entry within that group using one-hot or one-cold representation. Using such an encoding, it is possible to identify a particular entry within the storage circuitry using one-hot or one-cold representation (which can be analysed quickly by the comparison circuitry) using a smaller number of bits than would be necessary if the one-hot or one-cold representation were required to identify any entry within the storage circuitry. The second encoding is used in a case of entries for which the previous instruction is a multi-cycle instruction. In this case, the encoding is simply the number of bits required to identify an output destination. Accordingly, the size of the dependency field itself is the larger of the number of bits used for the first encoding and the number of bits required for the second encoding. In this way, any entry can be encoded using either of the two encodings as required.

In some embodiments, the group of entries is one of two groups of entries, each comprising half the entries. Consequently, the first part may partition the group of entries in the storage circuitry into two. This can be done using a single bit, indicating whether the lower or higher half of entries in the storage circuitry is being referred to. The second part identifies an entry within either the first half or the second half using one-hot or one-cold representation. If there are four entries in the top half and four entries in the bottom half (e.g. if the storage circuitry has eight entries) then the second part requires four bits. Thus, the overall encoding can identify any of the eight entries using five bits. Although this is more than the number of bits required to refer to an entry using binary (which can be done in three bits), by providing one-hot or one-cold representation, a comparison between a scheduled instruction and a given entry can be achieved quickly.

In some embodiments the processing circuitry comprises a plurality of processing circuits; and the storage circuitry comprises a plurality of storage circuits, each associated with one of the processing circuits. The processing circuits may correspond with execution units and could include Arithmetic Logic Units (ALU), Floating Point Units (FPU), Memory Execution Units, and other execution units that will be known to the skilled person. The storage circuitry may then be made up from a plurality of storage circuits with each storage circuit being associated with one of the processing circuits. Data dependencies for an instruction are represented by entries in the storage circuit that is associated with the processing circuit that will execute the instruction. The data dependencies could, however, relate to an instruction executed by a different processing circuit and thus may reference an entry in another storage circuit. A further field may be provided in order to indicate which storage circuit a particular data dependency relates to.

In some embodiments, the data processing apparatus comprises a plurality of buses to transmit data dependency information.

In some embodiments, a number of the plurality of buses is at most equal to a number of results that can be simultaneously generated by the plurality of processing circuits. In some cases, a particular processing circuit maybe capable of executing two instructions simultaneously. Accordingly, in such embodiments, two busses may be associated with that processing circuit in order that dependencies can be updated by instructions that are simultaneously executed by that processing circuit. Alternately, a single processing circuit can produce multiple results. It will be appreciated that the number of results that can be simultaneously generated acts as an upper limit on the number of buses, there is no need for a processing circuit that generates a single result at a time to utilise multiple buses. Consequently, the circuit space required for the data processing apparatus can be reduced.

In some embodiments, at least one of the plurality of buses is adapted to transmit the data dependency information as: a reference to one of the entries that relates to the previous instruction, in a first mode of operation; and an indication of an output destination of the previous instruction, in a second mode of operation. Such embodiments make it possible to output different varieties of data dependencies on at least one of the buses. In particular, the bus is able to output either a reference to an entry that relates to the previous instruction or an indication of an output destination of the previous instruction. By enabling a bus to output a variety of data, it is possible to reduce the number of busses that would otherwise be necessary.

In some embodiments, a variable cycle processing circuit in the plurality of processing circuits is adapted to execute instructions that are single-cycle and instructions that are more than single-cycle; and when the variable cycle processing circuit executes one of the instructions that is single-cycle, the variable cycle processing circuit operates in the first mode of operation; and when the variable cycle processing circuit executes one of the instructions that is other than single-cycle, the variable cycle processing circuit operates in the second mode of operation. A variable cycle processing circuit is able to execute both single-cycle instructions and multi-cycle instructions. Consequently, when the variable cycle processing circuit executes an instruction that is single-cycle, the variable cycle processing circuit operates in the first mode of operation and consequently the bus that is associated with the variable cycle processing circuit outputs a reference to one of the entries that relates to the previous instruction. Similarly, when the variable cycle processing circuit executes a multi-cycle instruction, the variable cycle processing circuit operates in the second mode of operation in which the bus that is associated with the variable cycle processing circuit transmits a reference to the output destination of the previous instruction.

In some embodiments, each entry comprises an indication of whether that instruction is a single-cycle instruction; and when the previous instruction of a given entry is a single-cycle instruction, the given entry comprises a reference to a given storage circuit in the storage circuits and the entry that relates to the previous instruction is stored in the given storage circuit. Consequently, when an entry is single-cycle, it may be necessary to refer to an entry that exists in a different storage circuit. Since the same information is not necessary with respect to entries that relates to multi-cycle instructions, it is possible to provide an encoding in which the indication of whether an instruction is single-cycle or multi-cycle is combined with an indication of the storage circuit being referred to in case the instruction is a single-cycle instruction. By encoding this information together, it is possible to use a smaller number of bits than if the two pieces of information were stored separately.

Particular embodiments will now be described with reference to the figures.

FIG. 1 illustrates an example of a simplified pipeline 100. In the pipeline, a fetch unit 110 is responsible for fetching instructions that are to be executed. Having fetched these instructions, they are passed to a decode unit 120 that decodes them. A rename unit 125 then maps logic registers to physical registers in order to eliminate false dependencies. Outputs from the rename unit 125 are passed to a functional unit 150*a*, 150*b*, 150*c* for execution via a corresponding queue 130*a*, 130*b*, 130*c*. Each of the entries 140*aa*, 140*ca* in the queues 130*a*, 130*b*, 130*c* relates to an instruction, and illustrates one or more data dependencies of that instruction on other previous instructions. For instance, if a first instruction adds the contents of register r1 and register r2 and outputs the result in register r3 (r1=r2+r3) and a second instruction takes the value of register r3 and adds the value of register r4 to it (r3=r3+r4), then the second instruction has a data dependency on register r3 with respect to the first instruction. In other words, the second instruction cannot be executed until the result of the first instruction is known. When each of the data dependencies for a particular instruction is resolved, that instruction can be executed by the corresponding functional unit 150*a*, 150*b*, 150*c*. The result of the execution is output onto a result bus 160. Note that typically each of the functional units 150*a*, 150*b*, 150*c* can operate in parallel. Accordingly, each functional unit 150*a*, 150*b*, 150*c* requires a separate queue 130*a*, 130*b*, 130*c*. Here the queue represents an example of the claimed storage circuitry.

Once an instruction has been issued for execution, one or more data dependencies of other instructions in the queues 130*a*, 130*b*, 130*c* may be resolved.

Figure 2:
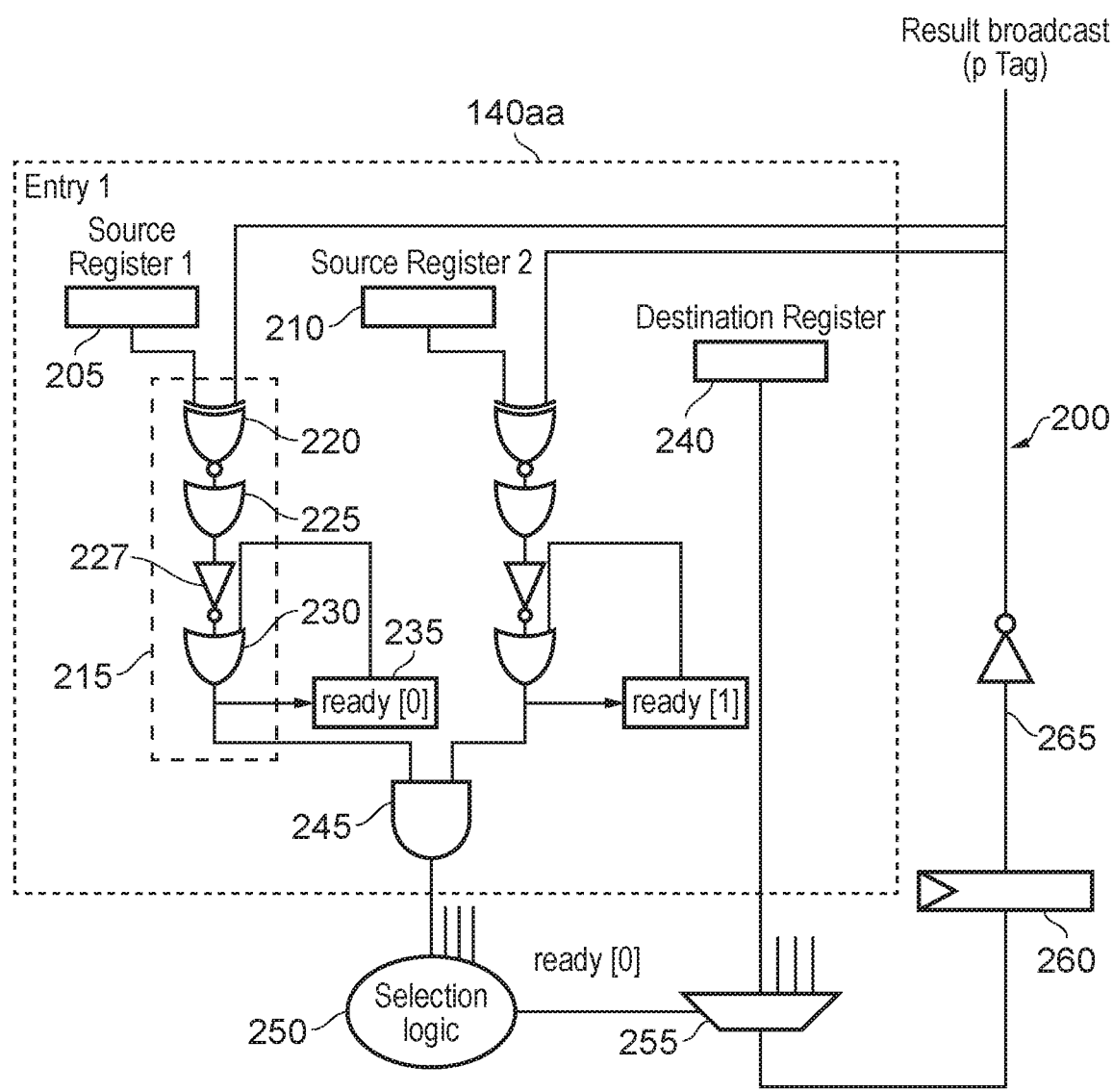
FIG. 2 illustrates example circuitry for determining which instruction is next to be issued.

FIG. 2 illustrates example circuitry 200 for determining which instruction is next to be issued. In this example, when an instruction has been executed, the inverted pTag of the output destination of that instruction is broadcast on a bus 265. The pTag represents a location where the output of the instruction is stored. For each of the entries 140aa, 140ca in one of the queues 130a, 130b, 130c, there exists a reference to a first source register 205, a reference to a second source register 210 and a reference to a destination register 240. Each of the source registers 205, 210 is compared to the result broadcast pTag output on the bus 265 using XNOR gates 220 (one for each bit). The result of the XNOR gates therefore output a series of zeros if the associated source register 205 matches the pre-inverted value output on the bus 265. In other words, the XNOR gates 220 will output a series of zeros if the output destination of the issued instruction is the source referred to in the source register 205. The XNOR gates are followed by a collapsing OR gate 225 followed by an inverter 227. This performs an OR operation on each of the bits output by the XNOR gates 225 to produce a single bit, which is then negated. Consequently, if each of the bits representing the corresponding source register 205 match the output to the bus 265 (i.e. pre-inversion), then the result of the OR will be a zero and negating this will produce a one. Otherwise a zero will be produced. The inverter 227 is followed by an OR gate 230. This takes two inputs. The first input is from the inverter 227 and the second input is from a storage structure 235 that stores a ready bit in respect of this source register 205. Consequently, the OR gate will output a one if either the result of the inverter 227 is a one or if a one is stored in the storage structure 235 that stores the ready bit. Similarly, the output of the OR gate 230 is passed to the storage structure 235. Consequently, as soon as an identifier of a register is output on the bus 265 that corresponds with the source register 205, the ready bit 235 will be set thereby indicating that this particular data dependency has been met. The same comparison circuitry 215 including the XNOR gates 220, collapsing OR gate 225, inverter 227, and OR gate 230 is also provided in respect of the second source register 210. Consequently, an AND gate 245 is provided that takes as inputs the two outputs of the two comparison circuitries 215. Thus when the data dependency of each of the source registers 205, 210 is met, the output of the AND gate 245 is one and otherwise the output is a zero. The output of the AND gate 245 therefore represents whether each of the data dependencies in respect of an entry 140aa is met. Accordingly, this circuitry 140aa is reproduced for each entry in a queue. Selection logic 250 is provided to take the input of each AND gate 245 and to use this to select one of the entries of a queue as the instruction next to be issued for execution. Typically, the selection logic will select the oldest instruction in the queue 130 for which all the data dependencies have been met. This information is passed as a selection signal to a multiplexer 255 that takes as an input the destination register 240 associated with each entry. This corresponds with the output location of a particular instruction. Thus, the output of the multiplexer 255 corresponds with the destination of the instruction that has been selected for issue. This output is provided to a flop 260. At the same time, the selection logic 250 causes the instruction to be passed to its corresponding functional unit 150 for execution. Accordingly, at the time that the destination register 240 is output by the flop 260, the instruction will be issued for execution. The destination register is then output onto the bus 265 where it is inverted and the process repeats. Note that the bus 265 broadcasts data dependency information and therefore differs from the result bus 160 shown in FIG. 1, which transmits the result itself.

As a consequence of both the multiplexer and particularly the XNOR gates 220, this circuitry is very tight for meeting cycle time requirements. In particular, where a single-cycle pick-to-pick latency is to be produced, there is only a single-cycle available for a result to be broadcast. This can limit the size of queues and thereby the size of the OOO window and ILP. In contrast, when a multi-cycle pick-to-pick latency is present, more time is available for the destination register to be output on the bus 265 since the instruction corresponding to the entry having that destination register 240 may take multiple cycles to produce the result. However, it will be appreciated that when a particular instruction is issued for execution, the entry 140aa corresponding with that instruction can be the deallocated (i.e. invalidated or erased) since the data relating to that instruction for the purposes of scheduling is no longer required. The entry can be re-used by a younger instruction with no aliasing issues.

Figure 3:
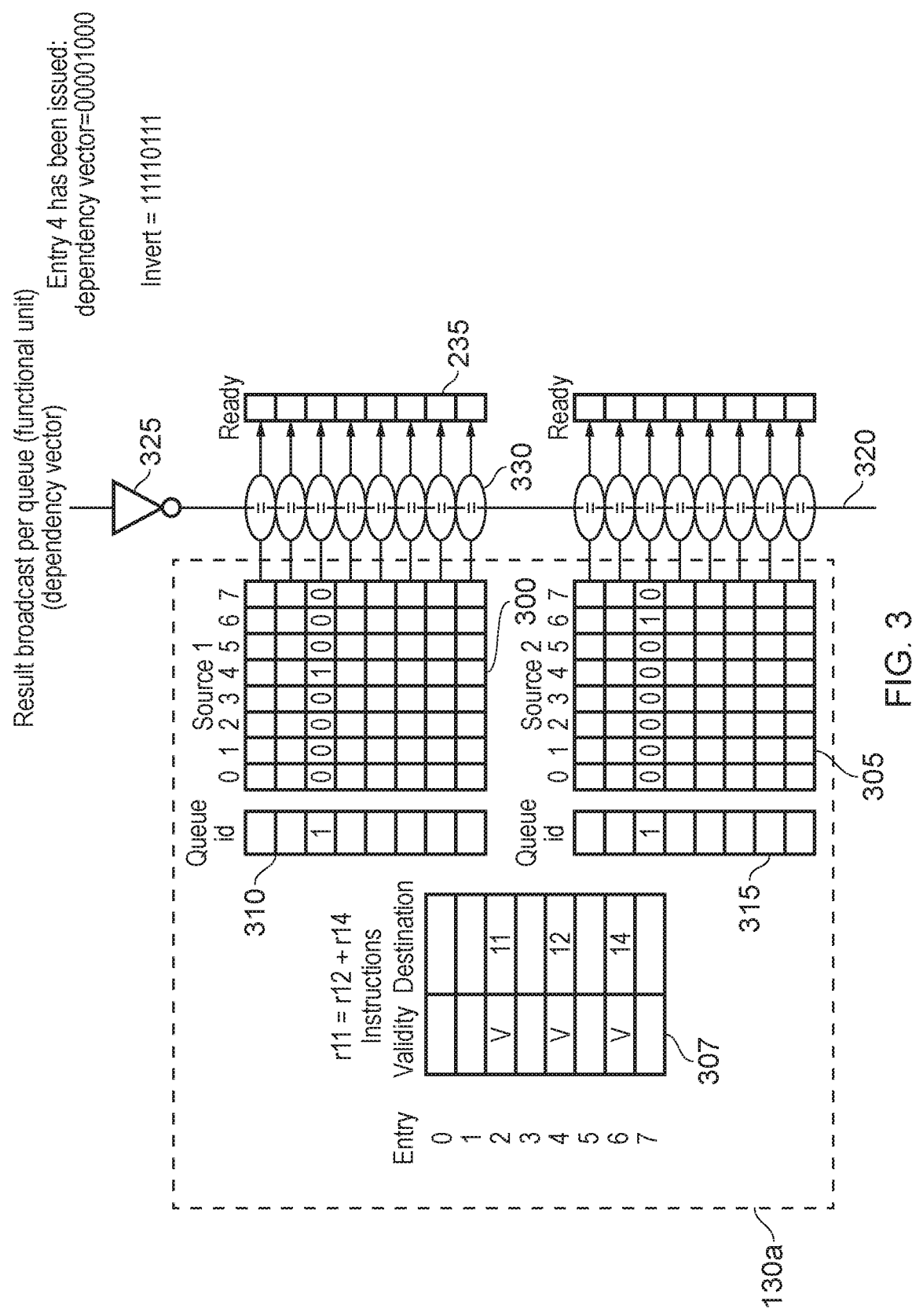
FIG. 3 illustrates a method for determining which instruction is ready to be issued using dependency matrices.

FIG. 3 illustrates an alternative method using dependency matrices. Here, the queue 130a is made up from a number of data structures. An instructions identifier storage circuit 307 stores an entry for each instruction. In particular, the output destination of an instruction is stored together with a validity indicator to indicate whether the entry is valid (e.g. current). The entry number at which the instruction is entered is, for the purposes of this example, irrelevant, except to say that there is consistency across all the data structures in the queue 130a. Accordingly, as shown in FIG. 3 the queue 130a contains references to three instructions. The first instruction at entry two outputs data to register r11. The second instruction at entry 4 outputs data to a register r12, and a third instruction at entry 6 outputs data to a register r14. Further data structures in the form of dependency matrices 300, 305 including queue identifiers 310, 315 are also provided. A dependency matrix and a queue identifier exists for each possible source of an instruction. For instance, if the instruction set supports instructions having three sources and a destination, then three dependency matrices 300, 305 and an instructions identifier storage circuit 307 are provided for each functional unit 150. In this embodiment, each dependency field (e.g. row) within a dependency matrix 300, 305 comprises a single data dependency for an instruction. In particular, the row number at which the entry is stored corresponds with the instruction at the same entry number of the instructions identifier storage circuit 307. For instance, in the example of FIG. 3, an entry is shown in the dependency matrix 300 of the first source at row three. Accordingly, this corresponds with the instruction represented by the entry in row three (entry 2) in the instructions identifier storage circuit 307—which is indicated as outputting data to a register r11. Dependency fields within the dependency matrices 300, 305 are one-hot. In other words, a single cell within the row is a one while other cells are zeros. For a given row, the column having the value one represents the entry in the instructions identifier storage circuit 307 to which the data dependency relates. For example, in the case of FIG. 3, the value '1' is in the fourth column for the first source thereby referring to entry 4 of the instructions identifier storage circuit 307, which relates to register r12. In the case of the second source, the '1' is stored in column 6, thereby relating to entry 6 of the instructions identifier storage circuit 307, which concerns register r14. In other words, the operation that is represented by entry 2 in the instructions identifier storage circuit 307 depends on the instruction at entry 4 and the instruction at entry 6. This would be the situation in the case of the instruction "ADD r11, r12, r14", which takes the value in register r12 and the value in register r14 adds them together and stores the results in register r11. A queue identifier 310, 315 is associated with each dependency matrix 300, 305 and indicates the queue 130 containing the entry to which the corresponding dependency relates. In the example of FIG. 3, the value is always '1' indicating that the dependency relates to an entry in the first functional unit's queue 130a. In this example a number such as '2' would mean that there was a dependency on an instruction in the queue of a different functional unit 150. A result broadcast queue 320 is provided, which transmits a dependency vector. The dependency vector is a one-hot representation of an entry in the queue 130a which has been picked for issue. For instance, if the dependency vector has the value '00001000' then this would indicate that the fifth entry (entry number 4) in the queue 130a had been issued. Accordingly, any entry relying on the value stored in register 12 can be readied for execution (provided any other data dependencies of that instruction are met). An inverter 325 inverts the bits of the dependency vector. Thus, the previous example causes the bits to become '11110111'. This is then compared to each dependency field of each of the dependency matrices using comparison circuitry 330, which is associated with each row. The comparison circuitry comprises an AND gate followed by a collapsed NOR gate as will be discussed with respect to FIG. 4. Similarly, a ready bit 235 is stored to indicate whether or not the particular dependency reflected by that row has been previously met.

Figure 4:
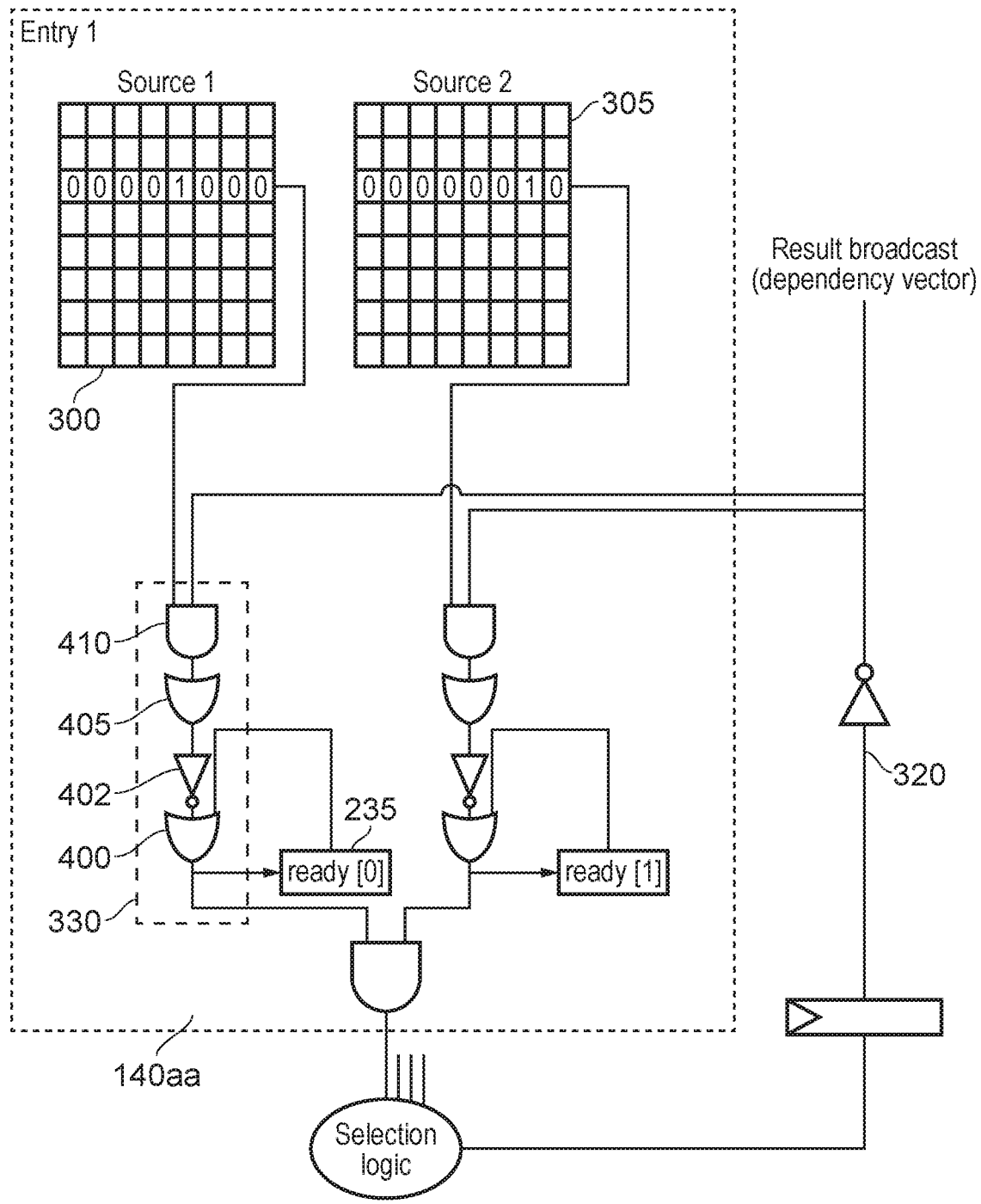
FIG. 4 illustrates circuitry for performing a comparison in the system demonstrated in FIG. 3.

FIG. 4 illustrates circuitry for performing a comparison in the system demonstrated in FIG. 3. In particular, in this example, an entry 140aa comprises an entry of the instructions identifier storage circuit 307 as well as a dependency field in each of the dependency matrices 300, 305. For each entry 140aa, comparison circuitry 330 is provided. The comparison circuitry 330 in this example includes an AND gate 410. This takes as inputs the dependency vector from the result broadcast bus 320 (which was in one-hot format), and the row of one of the dependency matrices 300, 305 that corresponds with this entry 140aa. By performing an AND operation, if the (inverted) dependency vector matches the entry (if the entry being referred to on the result broadcast bus 320 corresponds with the entry that this dependency relates to), then the output of the AND operation will be zero for each bit. Accordingly, performing a collapsed OR operation and inverting the outcome will result in a one. The collapsed OR operation is performed by OR gate 405 and the inversion is performed by inverter 402. As before, an OR gate 400 is provided in combination with a stored ready bit 235 so that once this dependency for this entry 140aa is met, the ready bit 235 is set and henceforth the entry will remain ready (i.e. indicating that the dependency has been met). As before, the comparison circuitry 330 is replicated in respect of the second source dependency matrix 305. Similarly, the overall circuitry 140aa is provided for each entry of the queue 130a.

It will be appreciated that in this example, the need for XNOR gates (e.g. one per bit of dependency information) is obviated. Also unlike the previous scheme, the multiplexer for reading out the destination register of the instruction selected for issue is avoided since we broadcast the dependency vector instead. Consequently, the timing constrains are lower. This circuitry is therefore well suited to a situation in which a single-cycle pick-to-pick latency with a large OOO window is desired. However, it will be appreciated that the entry in the dependency matrix 300, 305 cannot be deleted (e.g. invalidated) until the instruction's execution has been completed. This is because of aliasing—a particular entry might be referred to by another (younger) operation and so must remain. Hence, where multiple-cycle instructions are executed, an entry might remain for several processor cycles. Once an instruction executes, the data in question is available from the register file and so the entry relating to that instruction can be removed.

Figure 5:
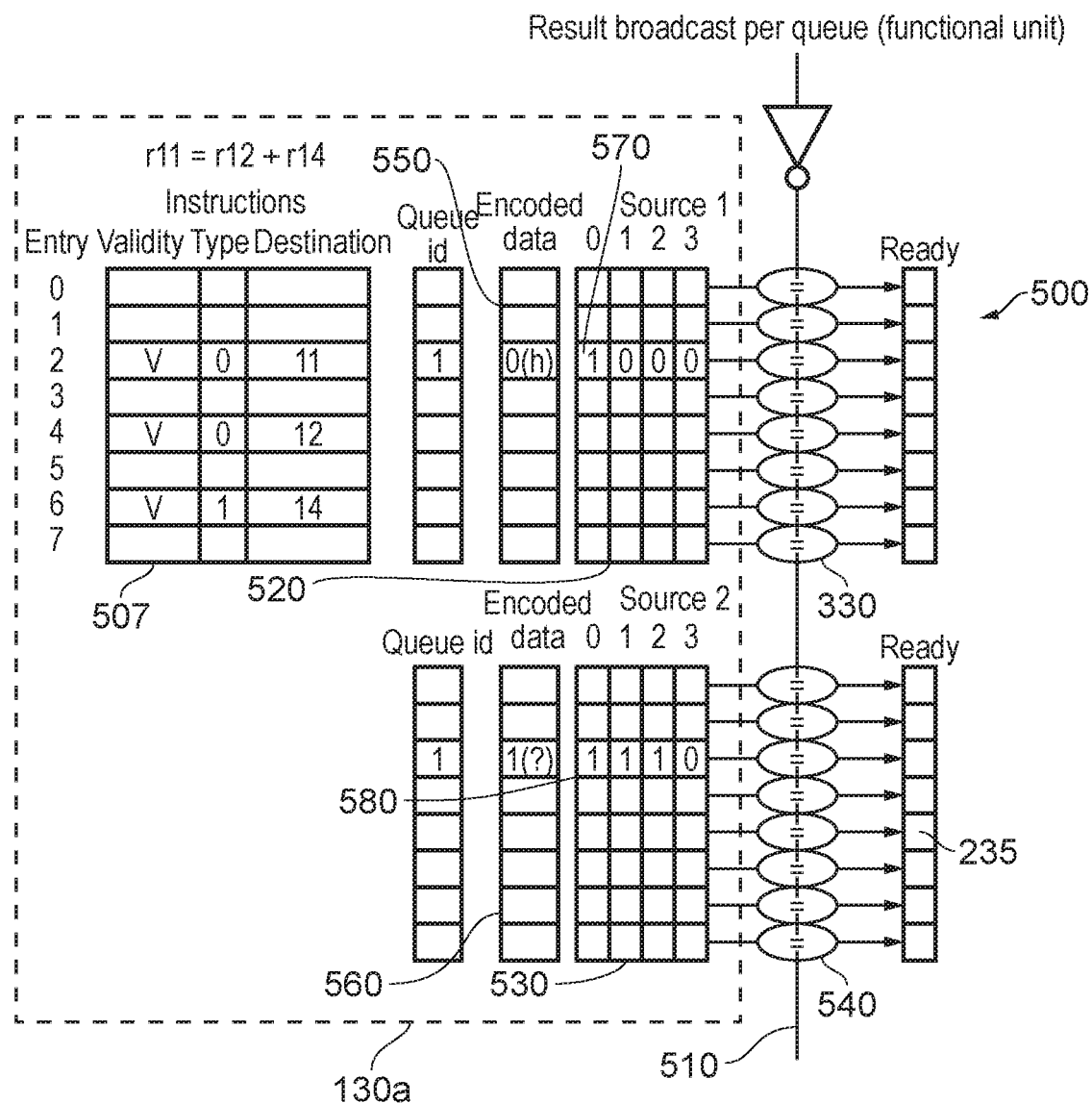
FIG. 5 illustrates circuitry that provides a hybrid approach.

FIG. 5 illustrates circuitry 500 that provides a hybrid approach. As before, a bus 510 is provided for each queue 130 of each functional unit 150. However, in this example, the bus 510 can transmit either a dependency vector as in the example of FIG. 3, or a pTag as in the example of FIG. 2. As each data dependency is transmitted on the bus 510 it is again compared to each dependency field 570, 580 of each dependency matrix 520, 530 using comparison circuitry 540. Suitable comparison circuitry 540 is shown in more detail with respect to FIG. 7. The dependency field 570, 580 uses different encodings depending on whether the instructions to which the dependency relates is a multi-cycle instruction or a single-cycle instruction. Where the instruction is a single-cycle instruction, the dependency field 570 uses one-hot representation to refer to one of the entries of the instructions identifier storage circuit 507. Where the instruction being referred to is a multi-cycle instruction, the dependency field 580 refers to a destination pTag.

In this example, the size of the dependency matrix 520, 530 can be further reduced by using special encoding for each dependency field 570, 580. In particular, rather than providing full one-hot representation, a single bit is used to indicate a subset of entries within the functional unit queue, and one-hot representation is used to refer to one of the entries within that subset. In this way, the number of bits needed to refer to a particular entry is the functional unit queue can be effectively halved. In this example, because there are eight entries in the functional unit queue, the modified one-hot representation can be expressed by using four bits (plus a further bit elsewhere to indicate whether the high or low entries of the functional unit queue are being referred to). At the same time, if there are 16 possible output registers, then this can also be expressed using the same four bits. Hence, as compared to previous examples, the same information can be represented using a dependency matrix 520, 530 that is half the size. Together with the dependency matrix, a further encoded data structure 550, 560 is provided. This encoded data combines an indication of whether the instruction associated with the data dependency is a single-cycle instruction or a multi-cycle instruction. The same encoding indicates, in the case of a single-cycle instruction, whether the high or low entries of the functional unit queue are being referred to. In this example, the encoded data field 550, 560 can be encoded using two bits. Consequently, the data dependency field 570 shown in the dependency matrix of the first source is referring to the first entry of the high-half entries in the functional unit queue. Accordingly, this is referring to the fifth entry (entry 4). Similarly, the dependency field 580 of the dependency matrix 530 of the second source is referring to register r14 (1110 in binary is 14 in decimal).

Figure 6:
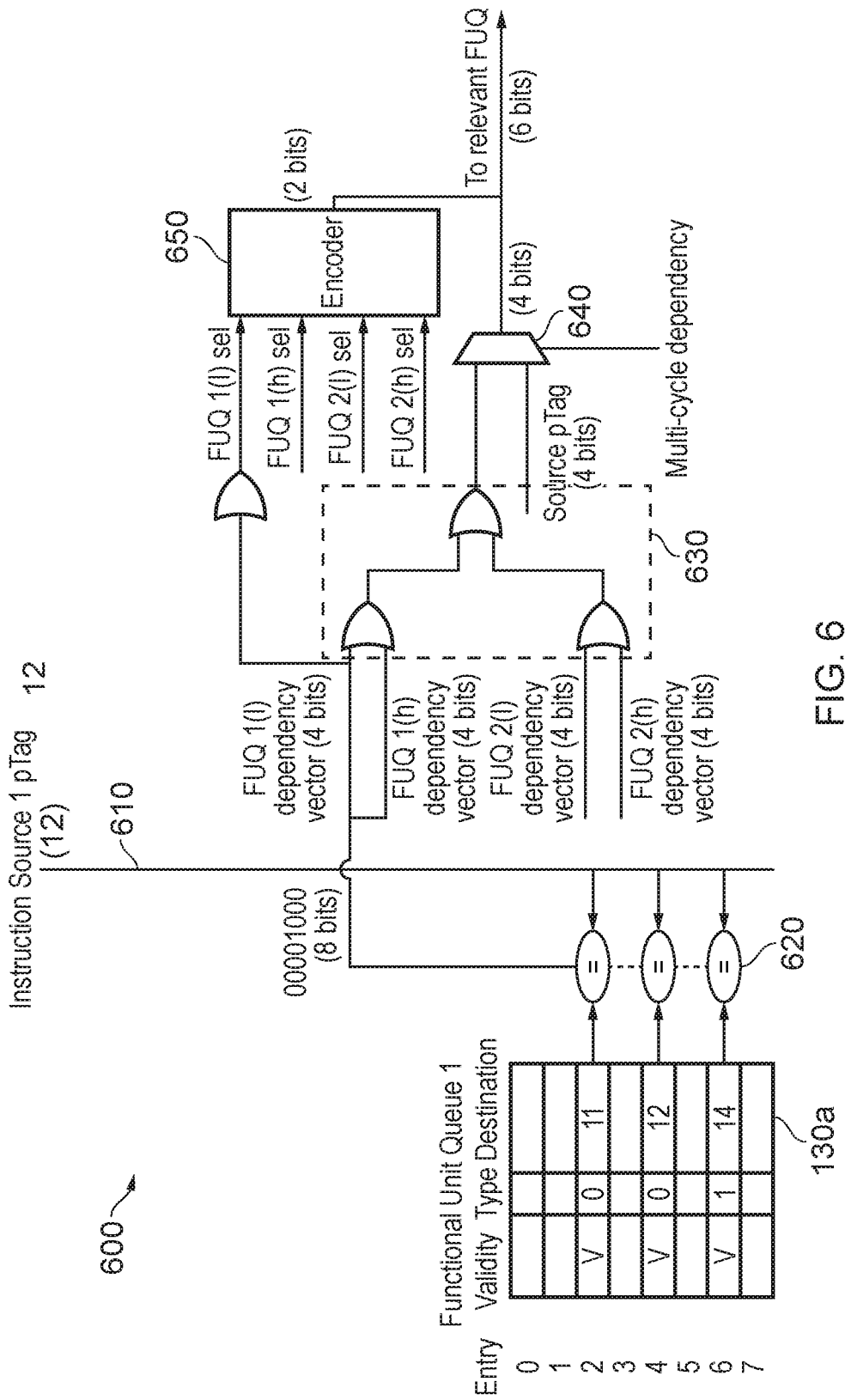
FIG. 6 illustrates circuitry for inserting an entry into a dependency matrix.

FIG. 6 illustrates circuitry 600 for inserting an entry for a new instruction into the dependency matrix 520, 530. The pTag of one of the sources of the new instruction is transmitted on a bus 610. This pTag is compared to each entry in the functional unit queue 130a using comparison circuitry 620. Since each destination should only appear once in a queue 130, this should hit at most once in the queue 130a. Consequently, the comparison circuitry 620 should produce a zero or one-hot value. In this example, the pTag is the value 12, and hits on the fifth entry (entry 4) of the queue 130a and thus the value output by the comparison circuitry 620 is the binary value '000001000'. This is separated into low bits and high bits. The same process is repeated for each queue 130a, 130b, 130c, since we don't know which queue we might match on. Using a cascading series of OR gates 630, these entries are merged and provided to multiplexer 640. Consequently, information as to which queue was matched can be used to set up the matrix. The source pTag is also provided to the multiplexer 640. If the pTag is the value 12, then this would be represented by the binary value 1100. The selection signal to the multiplexer 640 is whether the instruction that provides this source is a multi-cycle or single-cycle instruction. If dependent on a single-cycle instruction, the combination of dependency vectors produced by the cascading OR gates 630 is output whereas if dependent on a multi-cycle instruction, the source pTag is output. At the same time, an encoder 650 is provided, which provides the queue identifiers and takes as inputs, the result of performing a collapsed OR on each of the dependency vectors that are provided as inputs to the cascading OR gates 630.

The encoder 650 therefore outputs two bits indicating which of the queues 130 (FUQ1, FUQ2) is being referred to and whether the dependency is the low-half or the high-half. This information is relevant where there is a single-cycle dependency. This is combined with the four bit output by the multiplexer 640 and then output to the relevant queue 130 for storage.

Figure 7:
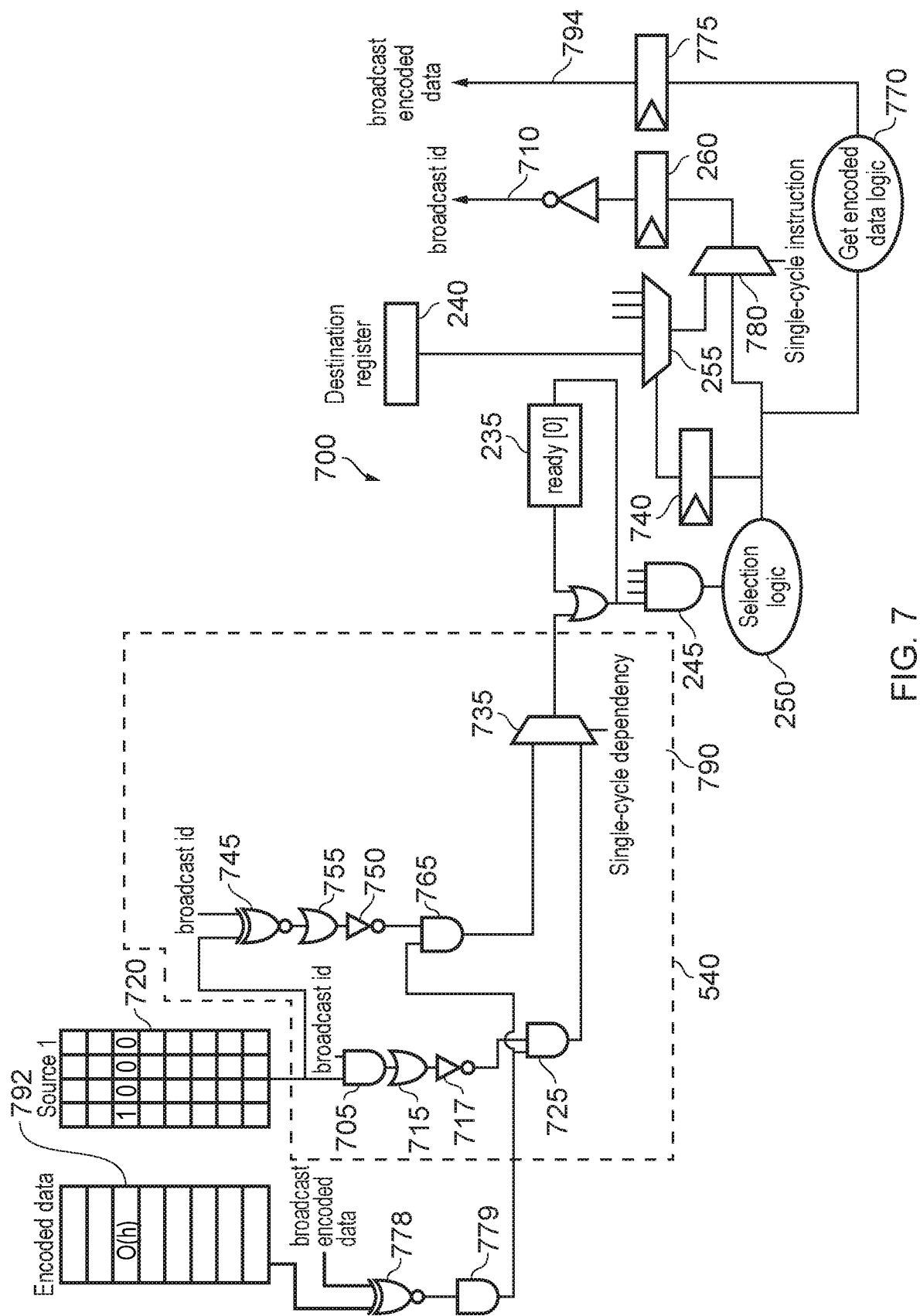
FIG. 7 illustrates an example of comparison circuitry that can be used in the example process shown in FIG. 5.

FIG. 7 illustrates an example of comparison circuitry 540 that can be used in the example process shown in FIG. 5. In a similar manner to that shown in FIG. 4, a dependency vector is output from the source dependency matrix 720 to AND gates (one for each bit) 705. A second input to the AND gates 705 is a value output on a result broadcast bus 710. The outputs of the AND gates 705 are then output to a collapsing OR gate 715, which produces a single bit, which is inverted by an inverter 717. As in the example of FIG. 4, the output of this collapsing OR gate 715 followed by an inverter 717 will be a one if there is match with the broadcast value. This is then output to AND gate 725. The output of this AND gate 725 will be a one if the entry retrieved from the source dependency matrix 720 matches the result output on the result broadcast bus and if the entry's corresponding encoded data matches what is output on the broadcast encoded data bus 794 (the process for which is discussed below). At a similar time, the broadcast value and the row retrieved from the source dependency matrix 720 are provided as inputs to XNOR gates 745 (one per bit), which output a series of bits. These are then provided as inputs to collapsing OR gate 755, which outputs a single bit. This is then inverted by inverter 750 provides an input to AND gate 765. The AND gate 765 also receives, as a second input, the output fromAND gate 779 (described below). The output of AND gate 765 is provided to the multiplexer 735. Additional circuitry is provided in order to compare the Queue ID of the broadcast and group ID (high/low), which we have collectively referred to as the encoded data. Based on the output of the selection logic 250, encoded data logic 770 is provided to obtain the corresponding encoded data for the selected instruction to be issued, which includes an indication of whether the selected instruction is single-cycle. This is then broadcast on a broadcast encoded data bus 794. The comparison circuitry 540 receives the broadcast encoded data and this is compared using XNOR gates 778 with the encoded data that corresponds with the dependency vector associated with this comparison circuitry 540. The XNOR gates 778 will therefore return a series of '1's if there is a match between the broadcast encoded data and the encoded data for the current entry. The series of bits output by the XNOR gates 778 are reduced to a single bit by the AND gate 779. Thus a '1' will be output by the AND gate 779 if there is a match between the broadcast encoded data and the encoded data for the current entry.

The remainder of the circuitry works in a similar manner to that discussed with respect of FIGS. 2 and 4. One further difference is that a multiplexer 780 is provided, which takes as inputs the output of the selection logic 250 and the selected destination register 240. The switching signal provided to the multiplexer 780 is an indicator of whether the instruction that has been issued is a single-cycle instruction. Accordingly, when the instruction being issued is a single-cycle instruction, the output of the multiplexer 780 corresponds with the output of the selection logic 250, which is a reference to an entry in one of the queues (dependency vector). Where the instruction being executed is a multi-cycle instruction, the output of the multiplexer 780 corresponds with the identity of the selected destination register 240. This is output to the broadcast bus 710, via the flop 260. In addition, a further flop 740 is provided between the multiplexer 255, which selects the destination registers 240 and the selection logic 250. This makes it possible to delay the outputting of the destination register 240, which is acceptable in situations where a multi-cycle instruction is being issued due to the delay in that instruction completing execution and this allows for relaxed timing requirements. As can be seen, this hybrid approach has the features of both the schemes shown in FIGS. 2 and 4. It has more relaxed timing constraints similar to the scheme shown in FIG. 4 and enables early deallocation for multi-cycle instructions, similar to the scheme shown in FIG. 2.

Figure 8:
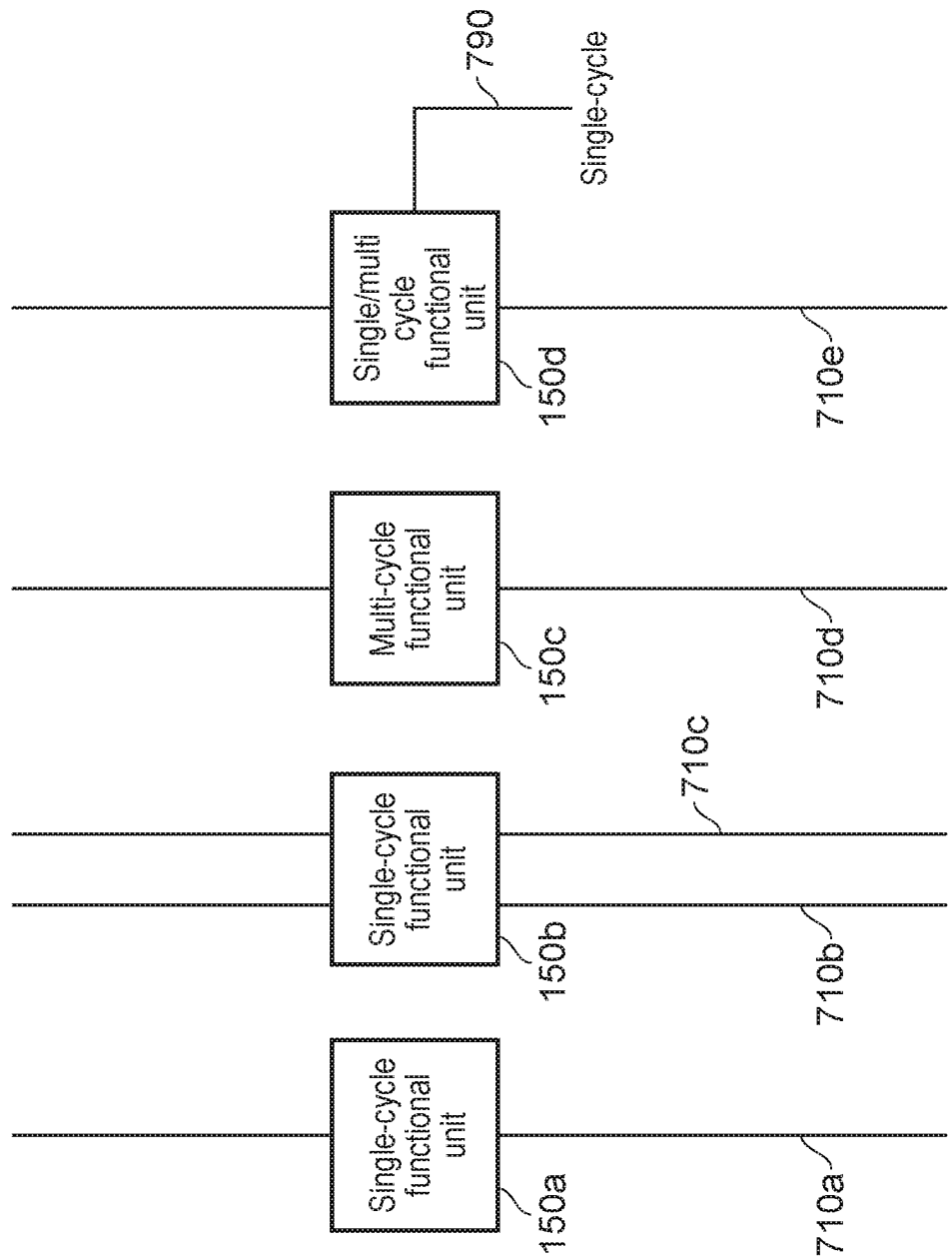
FIG. 8 illustrates a relationship between buses and the functional units.

FIG. 8 illustrates a relationship between buses 710 and the functional units 150. Functional units 150 can be single-cycle, multi-cycle, or mixed (meaning that the functional unit executes some instructions that take one cycle and others that take multiple cycles). In addition, some functional units 150b are capable of executing multiple instructions in a single cycle. Alternately, some functional units execute instructions that produce multiple results. The number of buses 710 used is at most equal to the number of results that can be simultaneously produced across all of the functional units 150, since this represents the number of dependencies that can be simultaneously met. Note that this is true even of the mixed single/multi cycle functional unit 150d. In particular, such a functional unit does not require separate buses for single and multi-cycle instructions. Instead, a single bus 710e is provided and a signal 790 is output to indicate whether the executed instruction is a single-cycle instruction or multi-cycle instruction. This provides guidance as to how the data output on the bus 710e is to be interpreted.

Figure 9:
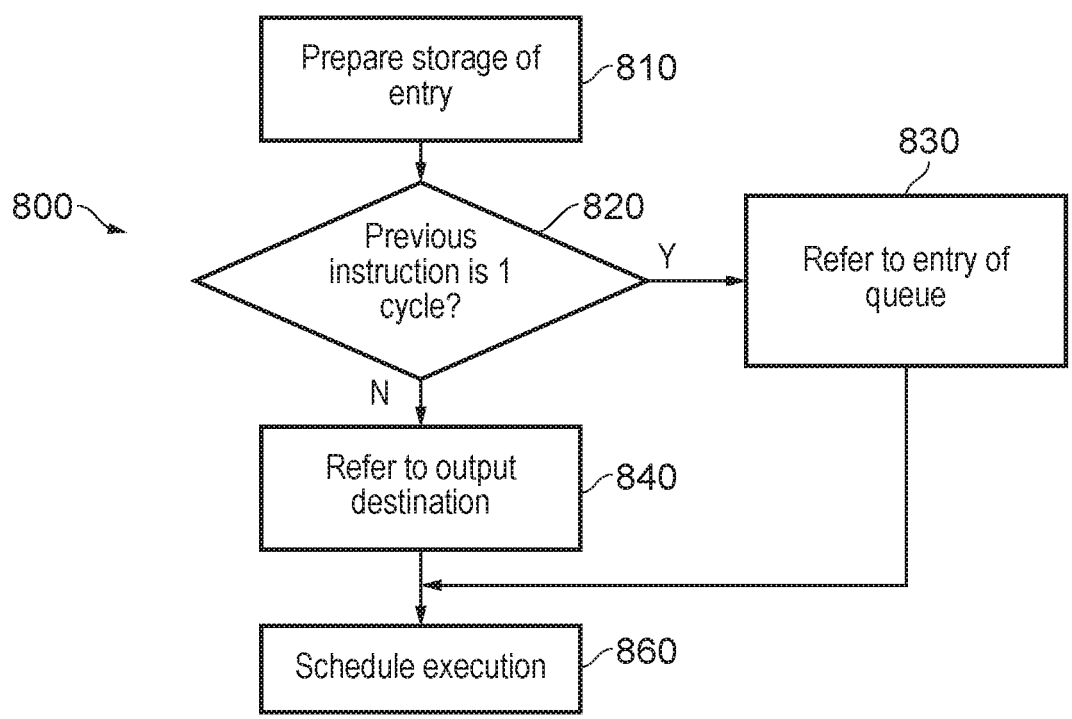
FIG. 9 illustrates a flow chart that shows an example method of scheduling.

FIG. 9 illustrates a flow chart 800 that shows an example method of scheduling. At a step 810, an entry is prepared for storage in the queue 130 of a functional unit 150. At a step 820, it is determined whether or not the previous instruction that is the subject of the data dependency to which the entry is being stored in the queue 130 is a single-cycle instruction or not. If so, then at step 830, a dependency field of the new entry references a further entry in one of the queues 130a, 130b, 130c. The process then proceeds to step 860 where execution of the next instruction is scheduled. If not, then at step 840, the dependency field of the entry references the output destination of the previous instruction that is the subject of the data dependency and then at step 860 execution of the next instruction is scheduled.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
processing circuitry to execute a plurality of instructions;
storage circuitry to store a plurality of entries, each entry relating to an instruction in the plurality of instructions and comprising a dependency field, wherein the dependency field is to store a data dependency of that instruction on a previous instruction in the plurality of instructions; and
scheduling circuitry to schedule the execution of the plurality of instructions in an order that depends on each data dependency, wherein
when the previous instruction is a single-cycle instruction, the dependency field comprises a reference to one of the entries that relates to the previous instruction,
otherwise, the data dependency field comprises an indication of an output destination of the previous instruction.

2. A data processing apparatus according to claim 1, wherein the scheduling circuitry is adapted to issue the instruction in response to resolution of each data dependency of the instruction.

3. A data processing apparatus according to claim 2, wherein the scheduling circuitry is adapted to issue the instruction in response to the instruction being the oldest instruction for which each data dependency is resolved.

4. A data processing apparatus according to claim 1, wherein the scheduling circuitry is capable of scheduling the execution of the previous instruction and the instruction in contiguous cycles of the processing circuitry.

5. A data processing apparatus according to claim 1, wherein each entry comprises a ready field to indicate whether the data dependency has been resolved.

6. A data processing apparatus according to claim 5, comprising:
update circuitry to update the ready field of an entry in response to the previous instruction being issued for execution.

7. A data processing apparatus according to claim 6, wherein
the update circuitry comprises comparison circuitry to compare each entry to determine if its data dependency is resolved by execution of the previous instruction.

8. A data processing apparatus according to claim 7, wherein
the comparison circuitry comprises a first set of logic gates, a second set of logic gates, and a multiplexer;
the first set of logic gates and the second set of logic gates are provided as inputs to the multiplexer; and
a switching signal of the multiplexer indicates whether the previous instruction was a single-cycle instruction.

9. A data processing apparatus according to claim 7, wherein
at least some of the plurality of instructions relate to a plurality of sources; and
each of the entries is associated with one of the plurality of sources.

10. A data processing apparatus according to claim 1, wherein
the previous instruction is executed in one cycle of the processing circuitry; and
a period between the previous instruction being issued and the instruction being issued is one cycle of the processing circuitry.

11. A data processing apparatus according to claim 1, wherein
a size of the dependency field is the larger of a first component and a second component;
the first component is the sum of:
the number of bits to identify a group of entries in the storage circuitry, and
the number of bits to identify an entry within the group of entries using one-hot or one-cold representation; and
the second component is the number of bits required to identify the output destination.

12. A data processing apparatus according to claim 11, wherein the group of entries is one of two groups of entries, each comprising half the entries.

13. A data processing apparatus according to claim 1, wherein
the processing circuitry comprises a plurality of processing circuits; and
the storage circuitry comprises a plurality of storage circuits, each associated with one of the processing circuits.

14. A data processing apparatus according to claim 13, comprising:
a plurality of buses to transmit data dependency information.

15. A data processing apparatus according to claim 14, wherein
a number of the plurality of buses is at most equal to a number of results that can be simultaneously generated by the plurality of processing circuits.

16. A data processing apparatus according to claim 14, wherein
at least one of the plurality of buses is adapted to transmit the data dependency information as:
a reference to one of the entries that relates to the previous instruction, in a first mode of operation; and
an indication of an output destination of the previous instruction, in a second mode of operation.

17. A data processing apparatus according to claim 16, wherein
a variable cycle processing circuit in the plurality of processing circuits is adapted to execute instructions that are single-cycle and instructions that are more than single-cycle; and when the variable cycle processing circuit executes one of the instructions that is single-cycle, the variable cycle processing circuit operates in the first mode of operation; and when the variable cycle processing circuit executes one of the instructions that is other than single-cycle, the variable cycle processing circuit operates in the second mode of operation.

18. A data processing apparatus according to claim 13, wherein each entry comprises an indication of whether that instruction is a single-cycle instruction; and when the previous instruction of a given entry is a single-cycle instruction, the given entry comprises a reference to a given storage circuit in the storage circuits and the entry that relates to the previous instruction stored in the given storage circuit.

19. A data processing method, comprising:

executing a plurality of instructions;

storing a plurality of entries, each entry relating to an instruction in the plurality of instructions and comprising a dependency field, wherein the dependency field is to store a data dependency of that instruction on a previous instruction in the plurality of instructions; and scheduling the execution of the plurality of instructions in an order that depends on each data dependency, wherein when the previous instruction is a single-cycle instruction, the dependency field comprises a reference to one of the entries that relates to the previous instruction, otherwise, the data dependency field comprises an indication of an output destination of the previous instruction.

20. A data processing apparatus, comprising:

means for executing a plurality of instructions;

means for storing a plurality of entries, each entry relating to an instruction in the plurality of instructions and comprising a means for storing a data dependency of that instruction on a previous instruction in the plurality of instructions; and means for scheduling the execution of the plurality of instructions in an order that depends on each data dependency, wherein when the previous instruction is a single-cycle instruction, the dependency field comprises a reference to one of the entries that relates to the previous instruction, otherwise, the data dependency field comprises an indication of an output destination of the previous instruction.

* * * * *